United States Patent [19]
Ferrari et al.

[11] Patent Number: 5,773,719
[45] Date of Patent: Jun. 30, 1998

[54] FIXTURE FOR LOCKING MOTORCYCLE WHEELS ONTO A BALANCING MACHINE SHAFT

[75] Inventors: Gino Ferrari; Franco Maioli, both of Correggio, Italy

[73] Assignee: Femas, S.R.L., Correggio, Italy

[21] Appl. No.: 738,284

[22] Filed: Oct. 25, 1996

[30] Foreign Application Priority Data

Nov. 7, 1995 [IT] Italy ............................. RE95 0055 U

[51] Int. Cl.⁶ .................................................. G01M 1/00
[52] U.S. Cl. ................................. 73/487; 73/66; 73/460; 301/5.21
[58] Field of Search ............................. 73/487, 66, 460; 301/5.21

[56] References Cited

U.S. PATENT DOCUMENTS 4,332,169  6/1982  Stuart ........................................ 73/487
4,336,717  6/1982  Goebel ...................................... 73/487
5,615,574  4/1997  Drechsler et al. ........................ 73/487
5,656,775  8/1997  Kawabe ..................................... 73/487

Primary Examiner—Hezron E. Williams
Assistant Examiner—Richard A. Moller
Attorney, Agent, or Firm—Birch, Stewart, Kolasch & Birch, LLP

[57] ABSTRACT

A fixture for locking motorcycle wheels onto the shaft of balancing machines having a spindle coaxial to the shaft for supporting the wheel to be balanced, and members for making the shaft and the wheel rotationally rigid. The fixture includes a diametrical entrainment arm to be fixed to the end of the balancing shaft, and wheel clamping members provided by a body pivoted in the manner of a rocker element to each of the ends of the entrainment arm. The body having clamping members at one end, and at its opposite end a counter-weight is arranged such that, under the action of centrifugal force, the body increases its clamping action on the wheel.

8 Claims, 2 Drawing Sheets

FIXTURE FOR LOCKING MOTORCYCLE WHEELS ONTO A BALANCING MACHINE SHAFT

BACKGROUND OF THE INVENTION

1. Field of the Invention

This invention relates to a universal fixture for locking motorcycle wheels in general onto a balancing machine shaft.

2. Description of the Background Art

Wheels to be balanced are generally fixed to the balancing machine shaft at their hub, or at the central hole in the disc on which the tire is mounted.

This provides both centering of the wheel on the shaft and the torsional locking necessary for the shaft to rotate the wheel.

The aforesaid fixing system is not however suitable for motorcycle wheels, as these comprise a hub with rolling-contact bearings, so that the wheel cannot be entrained to rotate.

The shafts of balancing machines intended for motorcycle wheels therefore comprise means for rotatably entraining the wheel.

The entraining means includes a diametrical entrainment arm to be centrally fixed to the end of the balancing shaft of the balancing machine, a removable support spindle which is coaxial to the shaft and forms an extension thereof, and diametrically opposing means applied to the arm and arranged to engage the disc of the wheel mounted on the spindle.

The entraining means sometimes consist of two pads positioned at the ends of two levers pivoted to the ends of said arm, to form a clamp which grips the tire.

Such known fixtures suffer however from the problem that during rotation (for balancing purposes) of the entrainment arm, the levers carrying the pads tend to widen outwards by the effect of centrifugal force.

Essentially, the two pads have the tendency to move away from each other, thus compromising engagement with the tire and resulting in inaccuracies in wheel entrainment which negatively influence balancing precision.

SUMMARY OF THE INVENTION

The main object of the present invention is to eliminate the aforesaid problems within the context of a simple and rational construction.

According to the invention, this is achieved within the context of a fixture of the type stated in the introduction in that, at an intermediate point thereof, the levers carrying the clamping pads are connected to the entrainment arm and carry at the opposite end to that carrying the pad a suitable counter-weight such that their clamping force on the wheel becomes greater the higher the speed with which the entrainment arm rotates, by virtue of the centrifugal force in play.

Each individual clamping pad is fixed to the end of a body which is pivoted in the manner of a rocker element to the respective end of the entrainment arm, and of which the opposing portion distant from pad has a weight greater than the other portion of body, for equal barycentric lever arms.

Moreover, between the entrainment arm and the respective rocker element there are preferably interposed elastic means, such as a traction or torsion spring, arranged to maintain the pad constantly urged towards its closed position.

The force made available by said elastic means is greater than the weight difference between the two opposing portions of the rocker element, such as to prevent any relative rotation between the pads and the tire during acceleration and braking of the wheel.

Retention means are also provided, for example in the form of an elastically loaded pawl, which are arranged to determine the limit of rotation of the respective rocker element towards the closed position, and to maintain it open to allow easy mounting of the wheel to be balanced and demounting of the balanced wheel on and from the spindle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
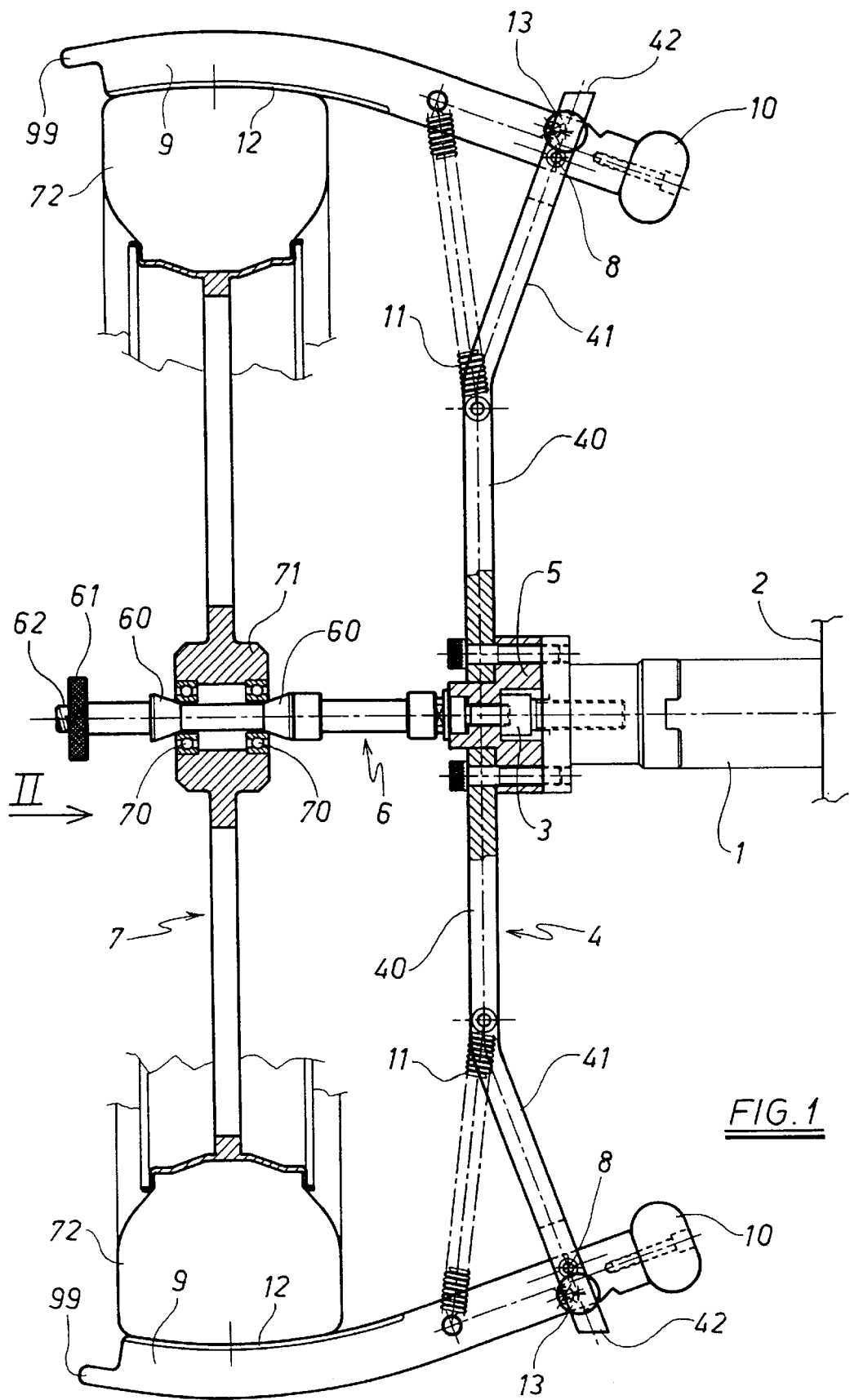
FIG. 1 is a side elevation of the invention.
Figure 2:
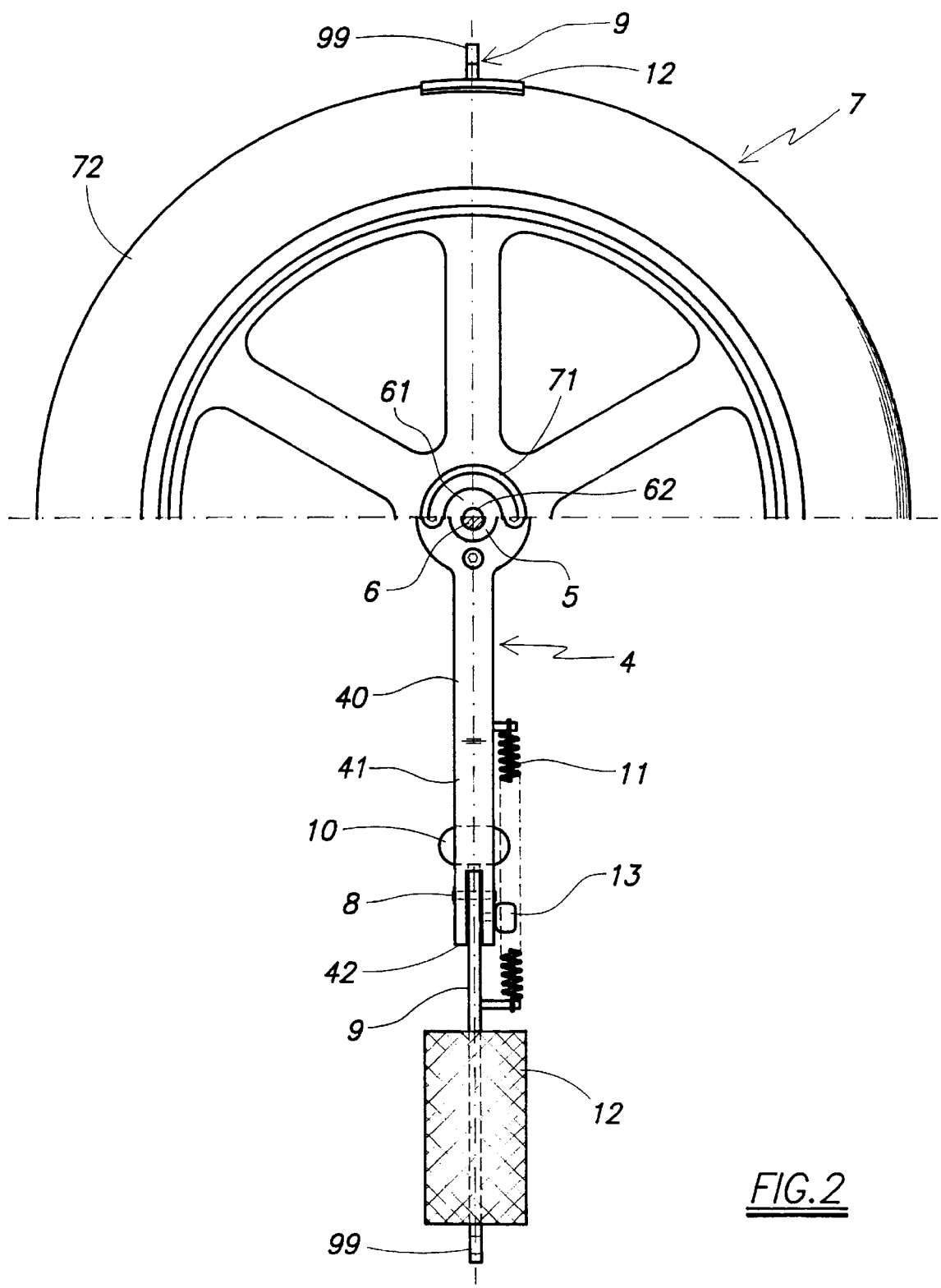
FIG. 2 is a view in the direction II of FIG. 1, in the upper part of which the respective clamping means is shown in the working position, whereas in its lower part the corresponding clamping means is shown in its rest position.

FIG. 1 shows the horizontal shaft 1 of a balancing machine 2. The balancing machine 2 is not shown as it is of a conventional type.

A composite element comprising a flanged body 5 is fixed centrally on the shaft 1 by a large coaxial screw.

A spindle 6 coaxial to the shaft 1 and arranged to support the (motorcycle) wheel 7 to be balanced, and an entrainment arm 4, are removably connected to the body 5 by threaded fasteners.

The spindle 6 comprises two opposing conical rings 60 which engage with the inner rings of the bearings 70 of the hub 71 of the wheel 7.

The outer conical ring 60 is associated with a tightening nut 61 which is screwed onto the threaded free end 62 of the spindle 6.

The arm 4 comprises a straight central portion 40 and two straight end portions 41 which are slightly bent toward the balancing machine 2, each terminating in a fork 42.

Each fork 42 carries a rocker lever 9, generally of light alloy, pivoted about a horizontal axis 8 perpendicular to the shaft 1.

This rocker lever a comprises an arched portion situated on the same side as the spindle 6, and an opposing portion shorter than the arched portion and carrying a counter-weight, generally of steel.

Between the arched portion and the arm 4 there is stretched a traction spring 11, the inner face of the arched portion having a surface 12 with a high friction coefficient, for example knurled, acting as a pad for engagement with the tire 72 of the wheel 7.

At this point it should be noted that, taking into account the lever arms between the barycentres of the opposing portions of the lever 9, including the counter-weight 10, and the axis 8 about which this lever is pivoted to the arm 4, the two portions are dimensioned such that when the balancing shaft rotates, the centrifugal force in play causes the levers 9 to rotate towards the tire 72, to increasingly tighten against the tire as the rotational speed increases.

Instead of the traction spring 11, a different elastic member can be provided, such as a torsion spring associated with the pivot 8.

As stated, the spring 11 maintains the lever 9 constantly elastically urged towards the spindle 6, and in order to prevent the lever 9 from closing in book fashion against the arm 4, the fork 42 of the arm 4 comprises a retention device 13.

In the illustrated embodiment, the retention device 13, which is simple to implement by an expert, includes of a pawl with a knob which is slidable within a passage provided in one arm of the fork 42, and is elastically urged towards the lever 9, with which its free end interferes to limit rotation, if desired.

Finally, the front free end 99 of the lever 9 is shaped in the manner of an operating grip.

The merits and advantages of the invention, together with its use and operation, are apparent from the aforegoing and from an examination of the accompanying figures.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

What is claimed is:

1. A fixture for locking motorcycle wheels onto the shaft of balancing machines having a spindle coaxial to the shaft and provided for supporting the wheel to be balanced, and means for making said shaft and said wheel rotationally rigid, comprising:

a diametrical entrainment arm to be fixed to the end of the shaft; and wheel clamping members each comprising a body in the manner of a rocker element pivotally attached to each of the ends of the entrainment arm, said body having clamping means at one end, and at its opposite end a counter-weight such that, under the action of centrifugal force, the body increases its clamping action on the wheel.

2. The fixture as claimed in claim 1, wherein said body includes a rocker lever which is pivotally attached to the end of the arm and has a free end situated at the same end as said clamping means.

3. The fixture as claimed in claim 1, wherein between said diametrical arm and each individual body there is interposed elastic means arranged to maintain said clamping means constantly urged into contact with the tire of said wheel.

4. The fixture as claimed in claim 1, wherein for each individual body there is provided a retention device which is arranged to determine the limit of rotation of said body by the effect of elastic means, to maintain said body in a rest configuration in which the clamping means are spaced from the tire, and to allow free rotation of said body when said clamping means are engaged with said tire.

5. A balancing machine for motorcycle wheels, the balancing machine being provided with the fixture claimed in claim 1.

6. A balancing machine for motorcycle wheels, the balancing machine being provided with the fixture claimed in claim 2.

7. A balancing machine for motorcycle wheels, the balancing machine being provided with the fixture claimed in claim 3.

8. A balancing machine for motorcycle wheels, the balancing machine being provided with the fixture claimed in claim 4.

* * * * *